United States Patent [19]

Cabeza

[11] 4,341,394
[45] Jul. 27, 1982

[54] SIMULTANEOUS CONNECTION BETWEEN HANDLEBAR AND STEERING FORK OF BICYCLES

[76] Inventor: Maximino R. Cabeza, Calle Central 709, Miramar, Santurce, P.R. 00907

[21] Appl. No.: 138,902

[22] Filed: Apr. 10, 1980

Related U.S. Application Data

[63] Continuation-in-part of Ser. No. 87,497, Oct. 23, 1979.

[51] Int. Cl.³ .............................................. B62K 21/18
[52] U.S. Cl. ..................................................... 280/279
[58] Field of Search ................. 280/279, 280; 301/115

[56] References Cited

U.S. PATENT DOCUMENTS 674,115  5/1901  Heilrath .............................. 301/115

FOREIGN PATENT DOCUMENTS 650744   9/1928  France ................................. 280/279
1129389  9/1956  France ................................. 280/279

*Primary Examiner*—John A. Pekar
*Attorney, Agent, or Firm*—Scrivener, Clarke, Scrivener and Johnson

[57] ABSTRACT

A connection between the handlebars and the steering fork of a bicycle wherein the handlebar stem is positioned within the steering fork. The connection includes a contractile clamping ring surrounding and connected by threads to the upper end of the fork stem. The clamping ring has an internal unthreaded surface surrounding the adjacent part of the handlebar stem and a frusto-conical external surface. A locknut loosely surrounds the handlebar stem and is connected by threads to the clamping ring. The locknut has a frusto-conical internal surface which engages the frusto-conical external surface of the clamping ring for causing engagement of the unthreaded internal surface of the clamping ring with the fork of the handlebar stem. The clamping ring has a plurality of radial cuts, and the internal surface of the upper part of the locknut is provided with a circumferential series of spaced notches which may be aligned with the cuts. A cotter pin may be inserted into one or more pairs of aligned cuts and notches to lock the clamping ring and locknut together.

1 Claim, 8 Drawing Figures

SIMULTANEOUS CONNECTION BETWEEN HANDLEBAR AND STEERING FORK OF BICYCLES

CROSS-REFERENCES TO RELATED APPLICATIONS

This application is a continuation-in-part of my co-pending application Ser. No. 87,497, filed Oct. 23, 1979, entitled Simultaneous Connection Between Handlebar and Steering Fork Of Bicycles.

SUMMARY OF THE INVENTION

The connection between the hollow cylindrical stem which extends upwardly from the steering fork of a bicycle and the stem which extends downwardly from the handlebars and is telescopically received within the fork stem is provided by a contractile ring which surrounds and bridges the upper end of the fork stem and the adjacent part of the handlebar stem and has at least one frusto-conical external surface. The ring is surrounded by a nut which has an internal frusto-conical surface whereby movement of the nut over the ring causes contraction of the split ring and resultant connection of the two stems. The split ring and the nut are provided with co-operating recesses which are moved to radially aligned positions by movement of the nut over the ring to receive a key which locks the nut and ring together.

DESCRIPTION OF THE INVENTION

Figure 1:
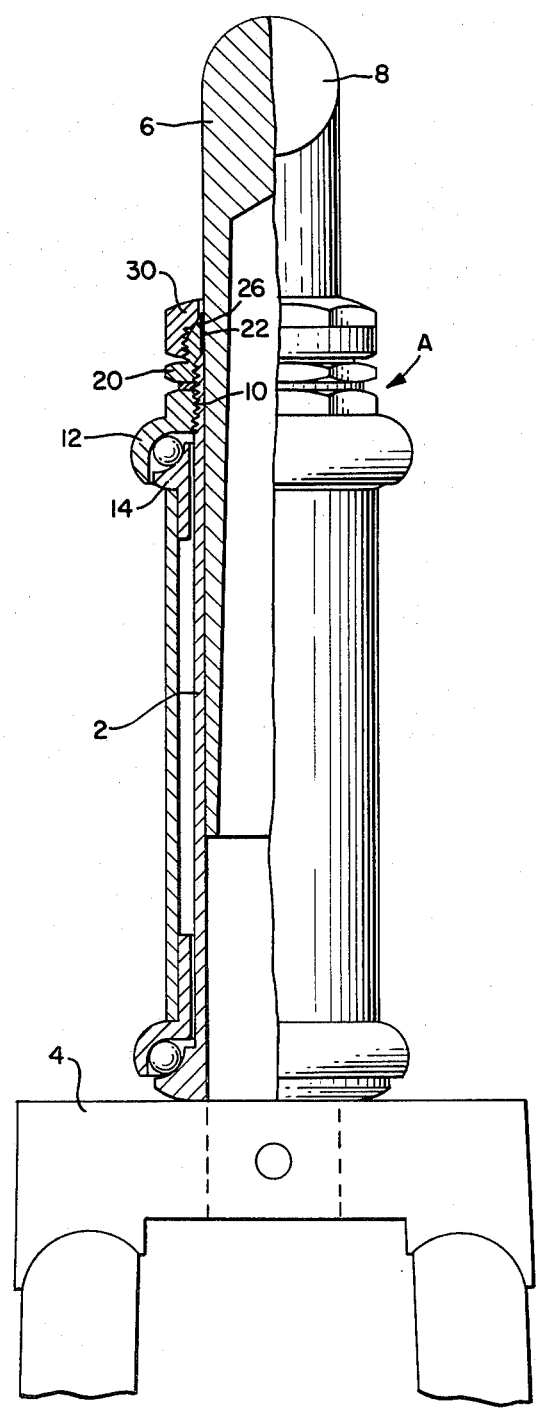
FIG. 1 shows a front elevation view and quarter section a bicycle steering apparatus in which connection of that apparatus to the handlebar stem is performed by the device which is provided by the present invention.
Figure 2:
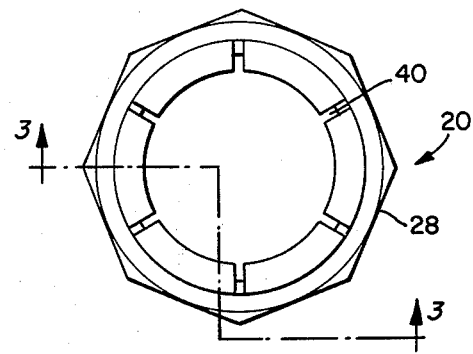
FIGS. 2, 3 and 4 are top, lateral-sectional and lower views of the clamping ring of the device.
Figure 3:
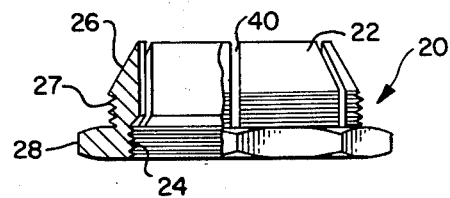
Figure 4:
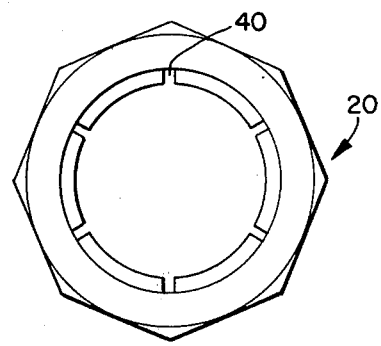
Figure 5:
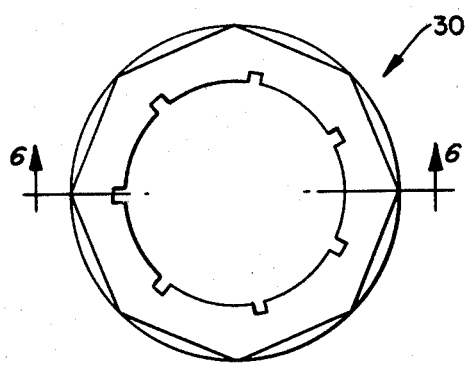
FIGS. 5, 6 and 7 are top, lateral-sectional and lower views of the locknut of the device.
Figure 6:
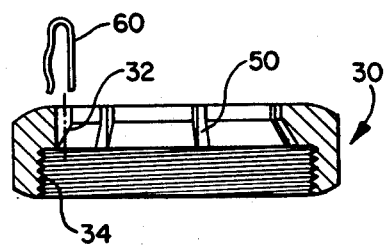
Figure 7:
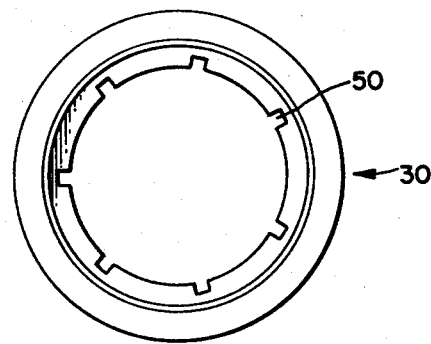

In the preferred embodiment of the invention disclosed in the drawings the conventional hollow cylindrical stem 2 extends upwardly from the steering fork 4 of the front wheels of the bicycle and receives the cylindrical stem 6 which extends downwardly from the bicycle handlebars 8. At its upper end part the fork stem 2 is provided with an external screw thread 10 by which it is connected to the upper member 12 of an annular ball bearing race, the lower rotatable member of which is shown at 14.

Above the upper ball race member 12 there is an annular clamping ring 20 which has at and adjacent its upper part a cylindrical internal surface 22 which closely surrounds and engages the outer surface of the cylindrical handlebar stem 6. Below this surface the ring is internally provided with an annular internal groove providing a threaded surface 24 which is screw threaded to the external thread 10 on the upper end of the steering fork stem 2. The upper part of the outer surface of the clamping ring is formed into a frusto-conical surface 26, and below that surface there is an external threaded surface 27 and below that surface there is a radially enlarged part 28 having multiple external surfaces for engagement by a wrench for turning the clamping ring.

An annular locknut 30 is positioned above the clamping ring in surrounding relation to the handlebar stem 6, and at its upper part is provided with an internal frusto-conical surface 32 which is adapted to lie in surface-to-surface engagement with the external frusto-conical surface 26 of the clamping ring. Below surface 32 the locknut is provided with an internal threaded surface 34 which is threaded to the external screw thread 27 on the clamping ring.

It will be seen that in the assembled relation of the parts the clamping ring is attached by internal screw threads 24 to the steering fork stem 2 and the locknut is attached to the clamping ring by threads 34 and 27 with the frusto-conical surfaces 32, 26 of the locknut and clamping ring, respectively, in engagement.

Figure 8:
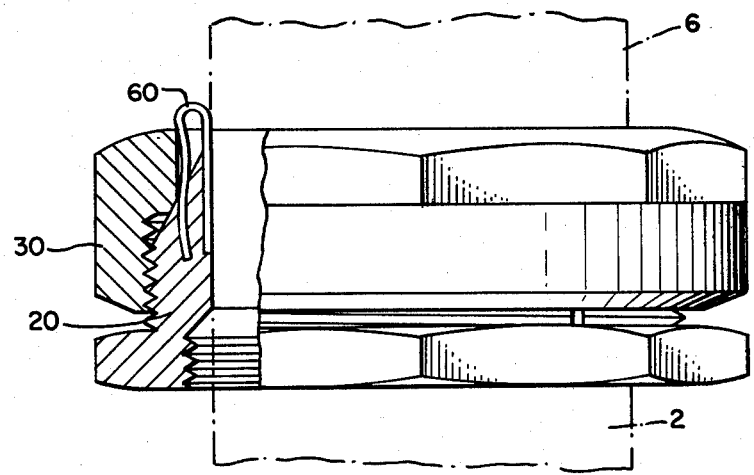
FIG. 8 shows the clamping ring and locknut in operative relation to each other, with the addition of the means provided by the invention for preventing their movement with respect to each other.

Means are provided by the invention for causing movement of the locknut against the clamping ring to tightly engage the clamping ring with the handlebar stem, thereby connecting the two stems, and means for locking the locknut and clamping ring together to prevent undesired disengagement of the two stems. For these purposes the upper part of the clamping ring 20 has a plurality of radial cuts 40 which extend through the material of the upper part and permit the ring to be squeezed tightly onto the stem 6 when the locknut is screwed downwardly onto the ring and the inclined surfaces of the nut and ring cooperate to reduce the size of the upper part of the ring by deformation. The internal surface of the upper part of the locknut is provided with a circumferential series of spaced notches 50 which extend radially into the material of the locknut, intersecting the frusto-conical internal surface 32. These notches are preferably substantially of the same width as the radial cuts in the clamping ring, and it will be apparent that as the locknut is turned to press downwardly and inwardly on the clamping ring the radial cuts 40 and the notches 50 may be aligned radially of the assembly. When in this position a cotter pins 60 may be inserted in each of one or more of the aligned pairs of cuts and notches, as illustrated in FIG. 8, thereby to lock the clamping ring and locknut together and prevent their relative rotation which might result in loosening of the engagement between the fork stem and handlebar stem.

I claim:

1. In combination with the upwardly extending hollow cylindrical stem of the steering fork of the front wheels of a bicycle, and the downwardly extending cylindrical handlebar stem which is positioned within the fork stem, means for connecting the two stems comprising:

a. a contractile clamping ring surrounding and connected by threads to the upper end of the fork stem and having an un-threaded internal surface surrounding the adjacent part of the handlebar stem, and having a frusto-conical external surface, b. a locknut loosely surrounding the handlebar stem and connected by threads to the clamping ring, and having a frusto-conical internal surface engaging the frusto-conical external surface of the clamping ring whereby screw threaded movement of the nut toward the ring contracts the ring to cause engagement of the un-threaded internal surface of the clamping ring with the handlebar stem, c. the clamping ring and the locknut having axially extending cuts and notches, respectively, which may be brought into radial alignment by relative threaded movement of the clamping ring and locknut, d. and a locking means such as a cotter pin positioned in the aligned cuts and notches to lock the clamping ring to the locknut and thereby lock the handlebar stem to the fork stem.

* * * * *